United States Patent
Shyamsukha et al.

(10) Patent No.: US 10,354,042 B2
(45) Date of Patent: Jul. 16, 2019

(54) SELECTIVELY REDUCING GRAPH BASED ANALYSIS PESSIMISM

(71) Applicant: Synopsys Inc., Mountain View, CA (US)

(72) Inventors: Ritesh Shyamsukha, Sunnyvale, CA (US); Chunyang Feng, Shanghai (CN); Shankar Radhakrishnan, Fremont, CA (US); Ted L. Craven, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/480,543

(22) Filed: Sep. 8, 2014

(65) Prior Publication Data

US 2016/0070844 A1 Mar. 10, 2016

(51) Int. Cl.
*G06F 17/50* (2006.01)

(52) U.S. Cl.
CPC ...... *G06F 17/5081* (2013.01); *G06F 17/5031* (2013.01); *G06F 17/5036* (2013.01); *G06F 17/5045* (2013.01); *G06F 2217/84* (2013.01)

(58) Field of Classification Search
CPC ............. G06F 17/5031; G06F 17/5045; G06F 17/5036; G06F 17/5068; G06F 17/5081
USPC .................. 716/106, 108, 110, 111, 113, 134
See application file for complete search history.

(56) References Cited

U.S. PATENT DOCUMENTS

| | | | |
|---|---|---|---|
| 6,237,127 B1 | 5/2001 | Craven et al. | |
| 7,251,797 B2 * | 7/2007 | Becer | G06F 17/5036 716/113 |
| 8,079,004 B2 * | 12/2011 | Soviani | G06F 17/5045 703/16 |
| 8,141,015 B1 * | 3/2012 | Govig | G06F 17/5031 716/108 |
| 8,321,824 B2 * | 11/2012 | Zejda | G06F 17/5031 716/108 |
| 8,407,640 B2 * | 3/2013 | Le | G06F 17/5031 703/19 |
| 8,555,222 B2 * | 10/2013 | Le | G06F 17/5031 703/19 |
| 8,788,995 B1 * | 7/2014 | Kumar | G06F 17/5031 716/110 |
| 8,863,052 B1 * | 10/2014 | Dhuria | G06F 17/5036 716/108 |

(Continued)

OTHER PUBLICATIONS

"EDA Vendors Should Improve the Runtime Performance of Path-Based Analysis", Ruben Molina, Electronic Design, May 10, 2013, published on the world wide web at: http://electronicdesign.com/eda/eda-vendors-should-improve-runtime-performance-path-based-analysis.

*Primary Examiner* — Helen Rossoshek
(74) *Attorney, Agent, or Firm* — Alston & Bird LLP

(57) ABSTRACT

A method, system or computer usable program product for improving a circuit design having a set of endpoint circuits including identifying a subset of the set of endpoint circuits for further timing analysis based on graph based analysis (GBA) of the circuit design; performing path based analysis (PBA) of a set of endpoint circuit paths in the subset of endpoint circuits; and providing a timing margin between graph based analysis and path based analysis for each of the set of endpoint circuit paths for reducing pessimism in subsequent graph based analysis of the set of endpoint circuit paths.

21 Claims, 7 Drawing Sheets

(56) References Cited

U.S. PATENT DOCUMENTS

| | | | |
|---|---|---|---|
| 8,930,864 B2 * | 1/2015 | Sinha | G06F 17/5036 716/106 |
| 2010/0281445 A1 | 11/2010 | Soviani et al. | |
| 2012/0311515 A1 * | 12/2012 | Zolotov | G06F 8/20 716/108 |
| 2014/0047403 A1 * | 2/2014 | Le | G06F 17/5031 716/108 |
| 2014/0298280 A1 * | 10/2014 | Dreibelbis | G06F 17/5031 716/113 |
| 2017/0235868 A1 * | 8/2017 | Wrixon | G06F 17/5081 716/108 |

* cited by examiner

FIG. 6A

Table 600:

| 605 ID | 610 Type | 615 Input Slew | 620 Output Load Time | 625 Multiplier | 630 Other Attributes |
|---|---|---|---|---|---|
| R1 | Register | - | - | 1.2 | - |
| N1 | NAND | - | - | 1.2 | - |
| N2 | NAND | - | - | 1.2 | - |
| N3 | NAND | - | - | 1.2 | - |
| N4 | NAND | - | - | 1.2 | - |
| B1 | Small Buffer | - | - | 1.2 | - |
| B2 | Small Buffer | - | - | 1.2 | - |
| ⋮ | ⋮ | ⋮ | ⋮ | ⋮ | ⋮ |

FIG. 6B

Table 650:

| 652 ID | 654 Endpoint Circuit ID | 660 Path Layout | 665 Required Arrival Time | 670 GBA Arrival Time | 675 GBA Slack | 680 PBA Arrival Time | 685 PBA Slack | 690 Margin | 695 Other |
|---|---|---|---|---|---|---|---|---|---|
| P1 | R1 | through N1/a | 100ps | 150ps | -50ps | 110ps | -10ps | 40ps | 1 |
| P2 | R1 | - | 100ps | 121ps | -21ps | - | - | - | 0 |
| P3 | R1 | - | 100ps | 100ps | 0 | - | - | - | 0 |
| P4 | R1 | - | 100ps | 118ps | -18ps | - | - | - | 0 |
| P5 | R1 | - | 100ps | 115ps | -15ps | - | - | - | 0 |

FIG. 7

Path P1

| Arc | GBA Arc Delay | GBA Depth | GBA Multiplier | GBA Final Delay | PBA Arc Delay | PBA Arc Depth | PBA Multiplier | PBA Final Delay |
|---|---|---|---|---|---|---|---|---|
| R2 | 10 | 10 | 1.10 | 11 | 10 | 10 | 1.1 | 11 |
| B1 | 10 | 10 | 1.10 | 11 | 10 | 10 | 1.1 | 11 |
| B2 | 10 | 10 | 1.10 | 11 | 10 | 10 | 1.1 | 11 |
| B3 | 10 | 10 | 1.10 | 11 | 10 | 10 | 1.1 | 11 |
| B4 | 10 | 10 | 1.10 | 11 | 10 | 10 | 1.1 | 11 |
| N1/a Z | 20 | 10 | 1.10 | 22 | 10 | 10 | 1.1 | 11 |
| B5 | 10 | 7 | 1.20 | 12 | 10 | 10 | 1.1 | 11 |
| B6 | 10 | 7 | 1.20 | 12 | 10 | 10 | 1.1 | 11 |
| N2/a Z | 20 | 7 | 1.20 | 24 | 10 | 10 | 1.1 | 11 |
| N4/a Z | 20 | 6 | 1.25 | 25 | 10 | 10 | 1.1 | 11 |
| Path Arrival | | | | 150 | | | | 110 |

US 10,354,042 B2

SELECTIVELY REDUCING GRAPH BASED ANALYSIS PESSIMISM

BACKGROUND

1. Technical Field

The present invention relates generally to electronic design automation, and in particular, to a computer implemented method for selectively reducing pessimism in graph based analysis of integrated circuits.

2. Description of Related Art

Some of the most complicated devices ever engineered by man are semiconductor integrated circuits. Some circuits such as microprocessors may include a billion transistors or more, and are getting more complicated in their design every year. As a result, testing throughout the design and manufacturing processes is necessary to be able to reliably manufacture these semiconductor integrated circuits. This includes testing of circuit designs, testing of layout designs derived from the circuit designs, and testing of the resulting manufactured integrated circuits.

Static timing analysis (STA) is often utilized for performing timing analysis towards validation and optimization of synchronous circuit designs. This allows the designer to make modifications to improve the reliability, efficiency, and/or speed of the circuit design. Pessimism is generally incorporated into STA so that variations in modeling, design and manufacturing are essentially taken into account.

Graph based analysis (GBA) is a type of STA used to perform worst case analysis of a circuit over all possible input combinations and all possible paths, but not of the logical operation of the circuit. GBA uses pessimism to improve the speed of the analysis. For example, GBA utilizes the worst input slew of all input pins through each logic element, but not the logic operation of the circuit.

Path based analysis (PBA) is another type of STA. used to calculates delays beginning at the input and tracing the path to the output. It is generally less pessimistic than GBA, but is much slower in an zing circuit designs as each circuit path analyzed. For example, only the slews of the input pins along a given. circuit path are considered in this analysis.

An implementation, optimization and engineering change order (ECO) process for fixing of a circuit design involves modifying the design to meet timing, power and area goals of the circuit while achieving the desired circuit functionalities. During this process a variety of transforms or other modifications are performed on circuit elements (e.g., gates and registers) and GBA static timing analysis is typically used to measure the circuit performance for timing goals. Since GBA does a worst case analysis, it is more pessimistic than PBA. However, due to the exhaustive nature of PBA and the amount of computational time needed to perform PBA, it is rarely used for optimization and generally only used at final signoff of a circuit design.

SUMMARY

The illustrative embodiments provide a method, system, and computer usable program product for improving a circuit design having a set of endpoint circuits including identifying a subset of the set of endpoint circuits for further timing analysis based on graph based analysis (GBA) of the circuit design; performing path based analysis (PBA) of a set of endpoint circuit paths in the subset of endpoint circuits; and providing a timing margin between graph based analysis and path based analysis for each of the set of endpoint circuit paths for reducing pessimism in subsequent graph based analysis of the set of endpoint circuit paths.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIGS. 6A-6B are block diagrams of data structures in which various embodiments may be implemented; and FIG. 7 is a block diagram of exemplary path delays for the exemplary circuit of FIG. 4 which can be utilized during selective path based analysis in which various embodiments may be implemented.

DETAILED DESCRIPTION

Figure 1:
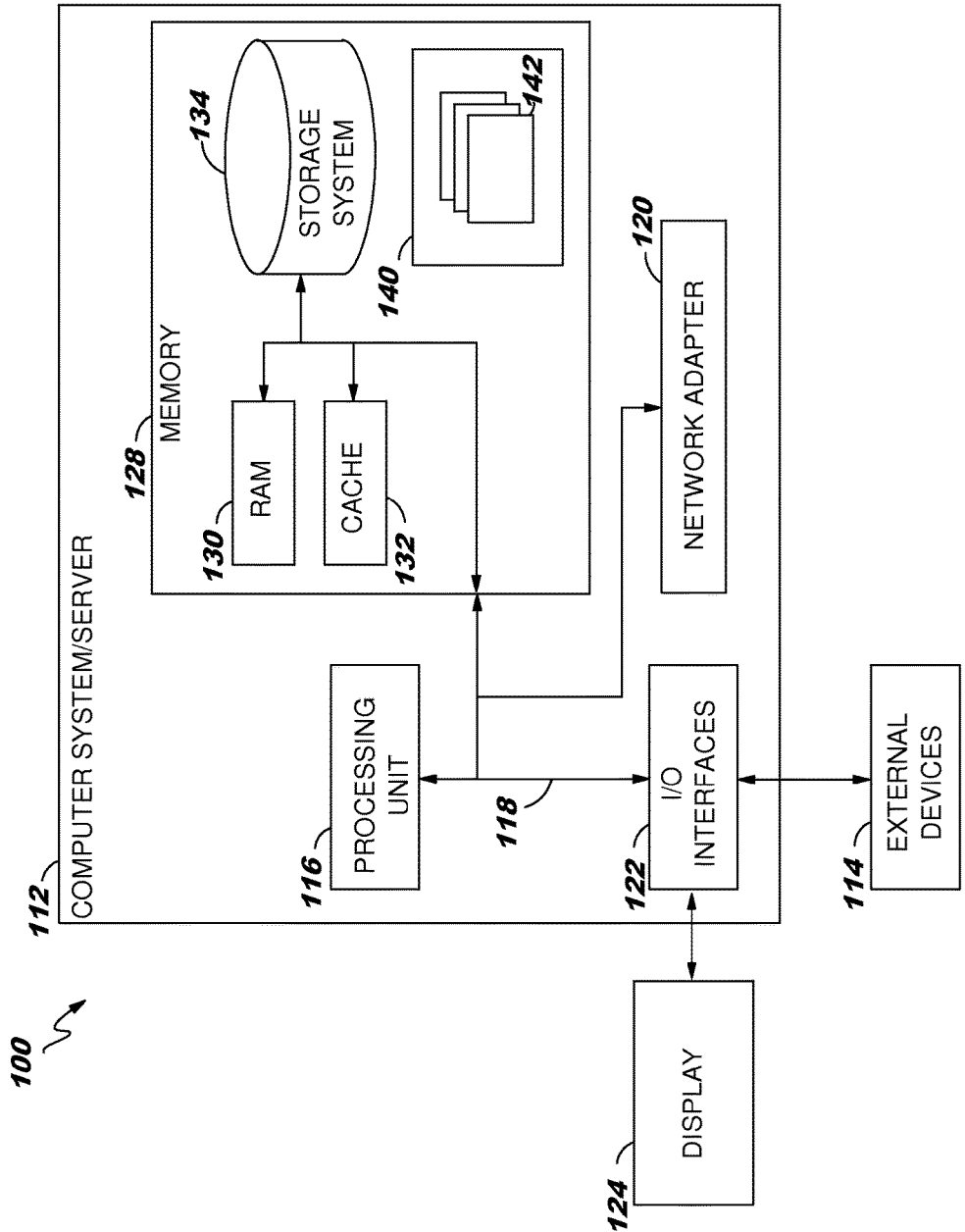
FIG. 1 is a block diagram of an illustrative data processing system in which various embodiments of the present disclosure may be implemented.

The design flow for an integrated circuit chip typically uses multiple tools to synthesize and implement a circuit design to provide the desired functionality while achieving certain timing, power and area goals. Timing of the circuit design is typically verified using a static timing analyzer. Optimizing software may be utilized by an engineer to perform transforms or other modifications on circuit elements such as gates, registers, interconnect, etc. to meet the design constraints in an optimizing process. Fixing timing violations often results in increasing the circuit area and power consumption. In addition, the optimizing software can be utilized to transform or otherwise modify the circuit design to reduce circuit area and power consumption of circuit elements not in the critical path. Circuit designs can include millions of gates, so the optimizing process needs to be quick and efficient to finish the circuit design in a reasonable amount of time.

Graph based analysis (GBA) uses worst case analysis to efficiently compute the timing of the circuit. GBA analysis is bounded by path based analysis (PBA). That is, an endpoint violation in PBA (i.e., the endpoint timing violates timing requirements) would always be an endpoint violation in GBA analysis, but an endpoint violation in GBA analysis may not violate timing requirements in GBA timing. Also, the amount of the timing violation in GBA would always be more pessimistic or the same as in PBA. As a result, an optimizing process using GBA may work harder on overcoming endpoint timing violations than necessary causing over-fixing of be circuit design for timing resulting in increased power consumption and/or increased area. This increase in chip area also increases the cost of the manufacturing of the circuit. In addition, over-fixing increases the circuit design time, thereby incurring additional costs.

Graph based analysis is often an order of magnitude faster and uses a smaller memory footprint than path based analysis and hence it is used to measure the change in circuit timing during optimization. An optimization process using optimizing software can invoke GBA analysis thousands of time to evaluate the improvements achieved by various transforms or other modifications of the circuit design. The subject method reduces the pessimism of GBA analysis allowing optimization to avoid over-fixing of the design. As a result, certain processes and devices may be implemented and utilized for selectively reducing graph based analysis pessimism. A faster form of circuit analysis may be utilized, such as graph based analysis, with path based analysis utilized only for selected paths to reduce graph based analysis pessimism for those paths. For example, path based analysis may only be utilized for the slowest or most critical paths identified with graph based analysis. This reduces the amount of over-fixing of the circuit design, resulting in fewer increases of power consumption and area while maintaining the efficiency of GBA analysis, thereby allowing the optimization process to invoke GBA analysis thousands of time to evaluate the improvements achieved by various circuit modifications. These processes and apparatuses may be implemented and utilized as will be explained with reference to the various embodiments below.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as selectively reducing graph based analysis pessimism.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for selectively reducing graph based analysis pessimism.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
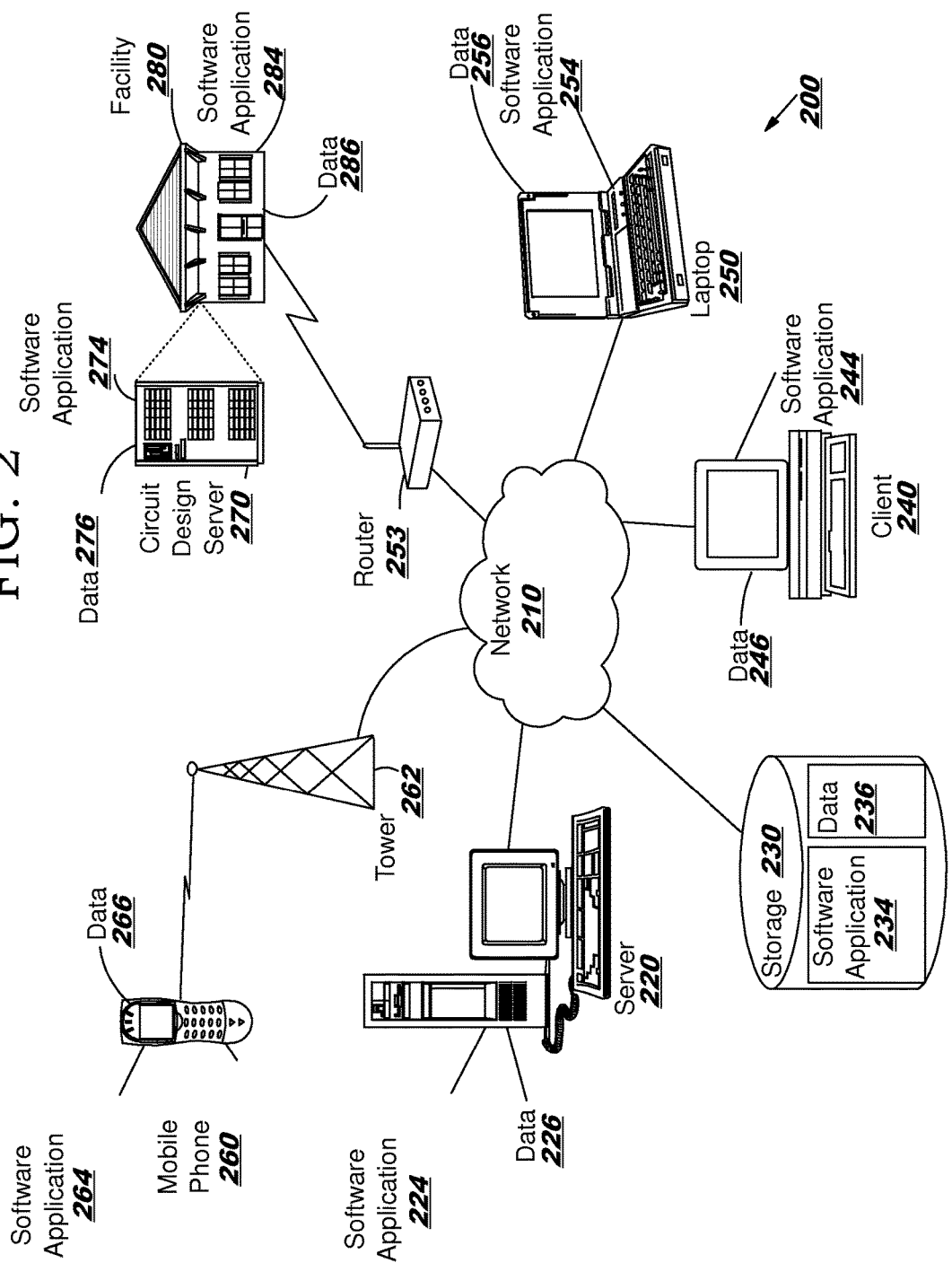
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for selectively reducing graph based analysis pessimism may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250, circuit design server 270 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260, circuit design server 270 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for selectively reducing graph based analysis pessimism or other software applications and data in accordance with embodiments described herein. Storage 230 may contain software application 234 and a content source such as data 236 for selectively reducing graph based analysis pessimism. Other software and content may be stored on storage 230 for sharing among various computer or other data processing devices. Client 240 may include software application 244 and data 246. Laptop 250 and mobile phone 260 may also include software applications 254 and 264 and data 256 and 266. Circuit design server 270 and facility 280 may include software applications 274 and 284 as well as data 276 and 286. Other types of data processing systems coupled to network 210 may also include software applications. Software applications could include a web browser, email, or other software application for selectively reducing graph based analysis pessimism.

Server 220, storage unit 230, client 240, laptop 250, mobile phone 260, circuit design server 270 and facility 280 and other data processing devices may couple to network 210 using wired connections, wireless communication protocols, or other suitable data connectivity. Client 240 may be, for example, a personal computer or a network computer.

In the depicted example, server 220 or circuit design server 270 may provide data, such as boot files, operating system images, and applications to client 240 and laptop 250. Servers 220 and 270 may be a single computer system or a set of multiple computer systems working together to provide services in a client server environment. Client 240 and laptop 250 may be clients to servers 220 and 270 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
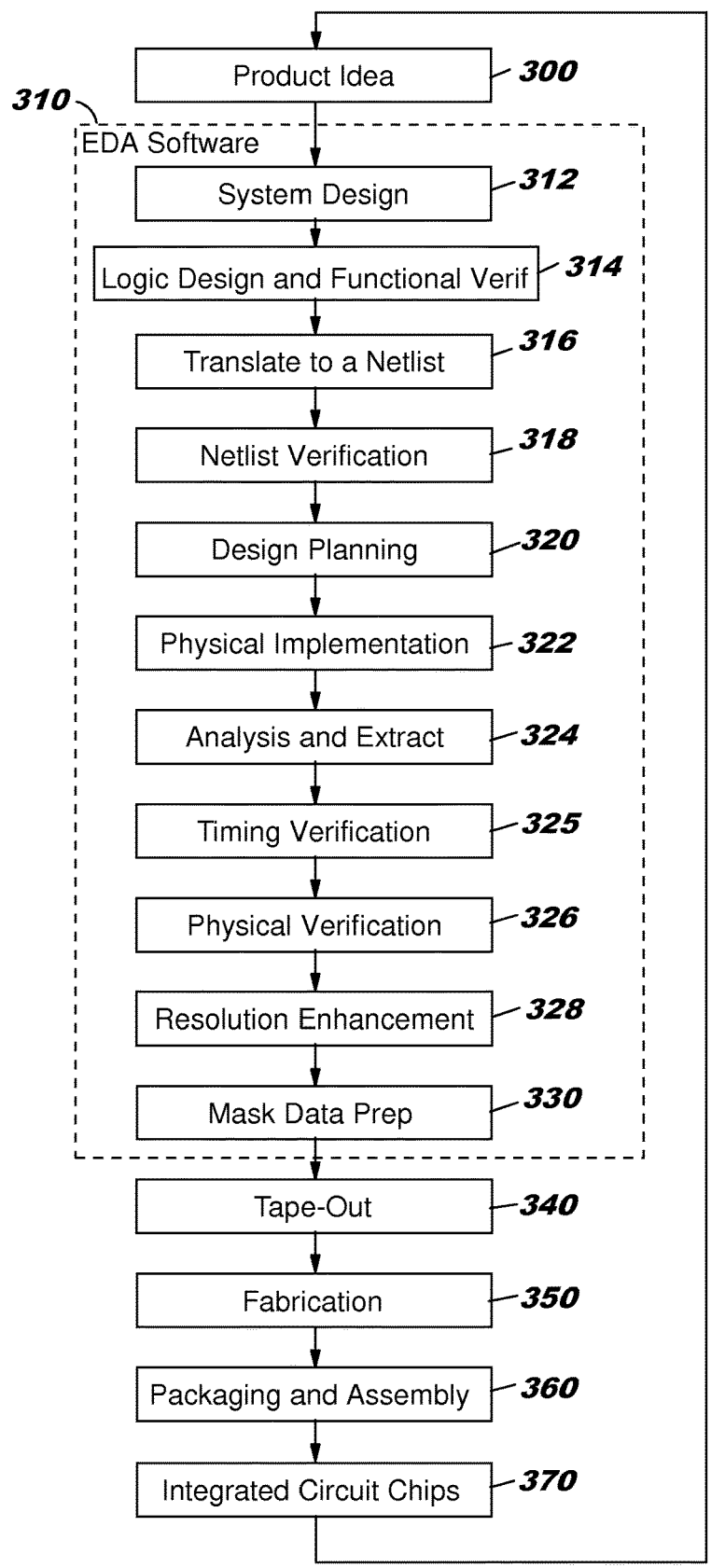
FIG. 3 is a flow diagram of the design and fabrication of an integrated circuit in which various embodiments may be implemented.

FIG. 3 is a flow diagram of the design and fabrication of an integrated circuit in which various embodiments may be implemented. The process starts with the generation of a product idea 300, which is developed into a circuit design using electronic design automation (EDA) software design process 310. When the design is finalized, it can be taped-out 340. After tape-out, the circuit is fabricated 350, packaged and assembled 360, resulting in a finished integrated circuit chip 370.

EDA software design process 310 includes multiple steps 312-330, which are described below. Note that this design flow description is for illustration purposes only. This description is not meant to limit the present invention. For example, an actual integrated circuit design may require a designer to perform the design stages in a different sequence than the sequence described herein. The following discussion provides further details of the stages in the design process.

In step 312, the circuit designers describe the functionality to implement in a system design. They can also perform what-if planning to refine the functionality and to check costs. Hardware/software architecture partitioning can occur at this stage. In step 314, referred to as logic design and functional verification, the VHDL or Verilog code for modules in the system is written and the design is checked for functional accuracy. More specifically, the design is checked to ensure that it produces the correct outputs. Then in step 316, the VHDL/Verilog is translated to a netlist. The netlist can be optimized for the target technology. Additionally, tests can be designed and implemented to check the finished chips. In step 318, the netlist is verified by checking for compliance with timing constraints and for correspondence with the VHDL/Verilog source code.

In step 320, referred to as design planning, an overall floor plan for the chip is constructed and analyzed for timing and top-level routing. Then in step 322, physical implementation is performed with the placement (positioning of circuit elements) and routing (connection of the circuit elements).

Additionally the circuit is optimized for area, timing and power goals. In step 324, referred to as analysis and extraction, the circuit function is verified at a transistor level which permits what-if refinement. Then in step 325, timing is typically verified using static timing analysis (STA) in which the netlist is checked for compliance with timing constraints and for correspondence with the VHDL/Verilog source code.

In step 326, physical verification is performed by checking the design to ensure correctness for manufacturing, electrical issues, lithographic issues, and circuitry. Then in step 328, resolution enhancement is performed which involves geometric manipulations of the layout to improve manufacturability of the design. Mask data preparation 330 then provides the tape-out data for production of masks to produce finished chips.

Embodiments of the present invention can be used during one or more of the above described steps. For illustrative purposes, two embodiments are described with reference to timing verification stage 325.

Figure 4:
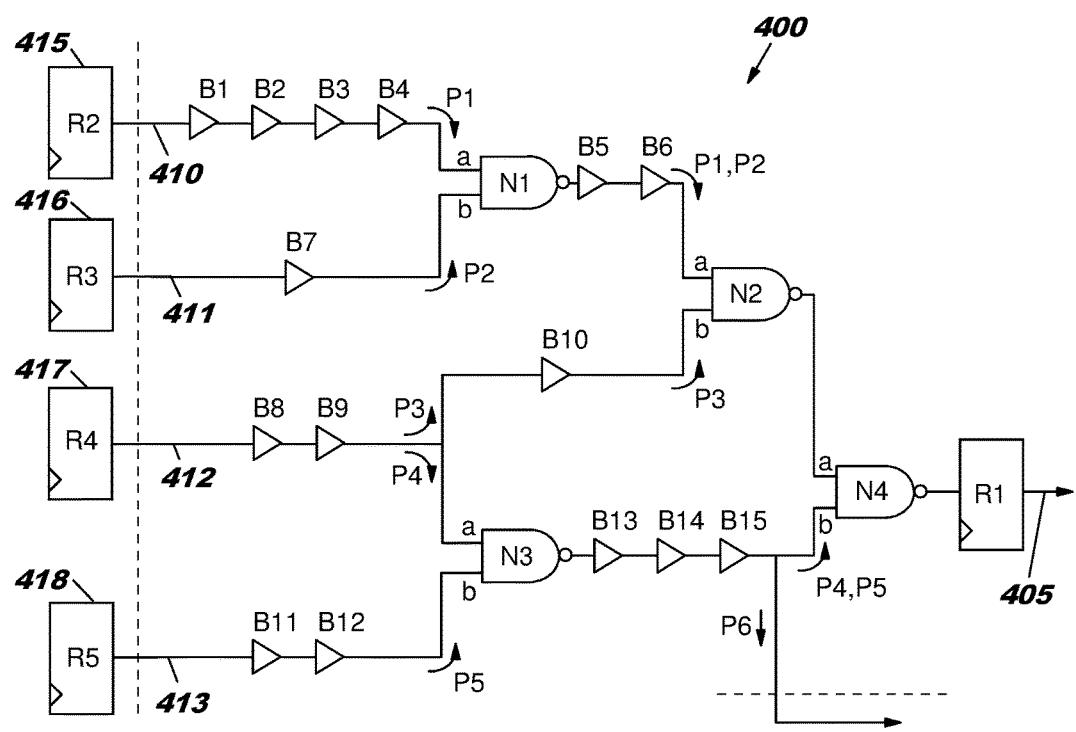
FIG. 4 is a diagram of an exemplary circuit which can be analyzed utilizing selective path based analysis in which various embodiments may be implemented.

FIG. 4 is a diagram of an exemplary circuit 400 which can be analyzed utilizing selective path based analysis in which various embodiments may be implemented. Circuit 400, also referred to herein as endpoint circuit 400, includes a set of circuitry and circuit paths utilized during a single clock cycle for a single endpoint such as endpoint 405. Endpoint 405 is a data pin of a register where data is not transmitted until an appropriate clock signal (e.g., a rising edge of a clock enable signal) is received. A register can be composed of a latch, flip-flop or other device which holds a signal until enabled by a clock or other signal. Endpoint circuit 400 can be one of a multitude of interconnected endpoint circuits within a semiconductor device such as a microprocessor or other integrated circuit. That is, endpoint 405 may be an input for other endpoint circuits in subsequent clock cycles and other endpoint circuits may be inputs to endpoint circuit 400 from previous clock cycles, with the other endpoint circuits being inputs for or receiving inputs from additional endpoint circuits. Two of more endpoints may share some common inputs and common circuitry, yet they are distinguished by having separate endpoint registers.

Endpoint circuit 400 is to be tested to determine whether signals from the inputs of the endpoint circuit reach the endpoint register within a specified amount of time, typically slightly less than one clock cycle. That is, the input signals should be released, propagate through the endpoint circuit elements, and reach the endpoint register in sufficient time within a clock cycle for stable operation of that endpoint circuit and taking into account normal variation in design and manufacturing of the endpoint circuit. This includes the release of the input signals from the upstream registers, the propagation of those input signals through each intermediate circuit element (including input slew and output load time for each circuit element) and reaching the endpoint register in sufficient time to capture that signal and hold it sufficiently long so that the endpoint register provides a stable output signal at the next clock cycle.

In the exemplary circuit shown on FIG. 4, there are four input signals 410, 411, 412 and 413 received from upstream registers 415, 416, 417 and 418. The upstream registers are not part of endpoint circuit 400, but are shown for illustrative purposes. Upon a clock enable signal (such as an clock rise signal), the input signals propagate through buffers B1 through B15 as well as NAND gates N1, N2, N3 and N4 until reaching register R1 with output pin 405. Each circuit element may be similar to other circuit elements (with the same or similar circuit design) or distinct in design. For example, there may be two types of buffers utilized with one buffer type being smaller and having less delay than the other buffer type. Also, there may be slight variation among same type circuit elements based on slight design differences. In addition, many other types of circuit elements may be utilized other than those shown in FIG. 4. For example, AND gates, resisters, etc. may also be utilized.

Five different paths P1, P2, P3, P4 and P5 are shown. Part of a sixth path P6 is also shown, but that is part of another endpoint circuit which is not shown. Path P1 starts at clock pin of register R2 and includes circuit elements B1, B2, B3, B4, N1, B5, B6, N2 and N4 to register R1. Path P2 starts at clock pin of register R3 and includes circuit elements B7, N1, B5, B6, N2 and N4 to register R1. Path P3 starts at clock pin of register R4 and includes circuit elements B8, B9, B10, N2, and N4 to register R1. Path P4 also starts at clock pin of register R4 and includes circuit elements B8, B9, N3, B13, B14, B15, and N4 to register R1. Path P5 starts at clock pin of register R5 and includes elements B11, B12, N3, B13, B14, B15 and N4 to register R1.

With graph based analysis (GBA), the pins of circuit elements are represented as nodes of the graph and the interconnects and internal arcs between pins of a gate or register are represented as the edges of the graph. The arrival time of the input signals at each node is a sum of the delays of each arc at its fan-in. For example, the arrival time of path P2 is a sum of the delay for circuit elements B7, N1, B5, B6, N2 and N4 to register R1 (and the nets connecting them). The delays are often dependent on the input slew and output capacitance for each gate arc. The interconnect delays are also dependent on the input slew, net parasitics, and capacitance of the load gate pins. The slew, delays and arrival times may be stored at each or some of the circuit elements.

There are several differences between graph based analysis and path based analysis, some of which are described herein. A first difference is referred to as a worst path arrival difference or pessimism. That is, in circuit elements with multiple inputs such as NAND gates, one input pin may have a faster input slew than another input pin. However, for graph based analysis, the worst input slew is used for that circuit element regardless of which pin the signal is passing through for that circuit element. This provides for faster analysis of the endpoint circuit, but also incorporates a pessimism which is largely unsupported by the underlying circuit element. In path based analysis, a separate input slew is utilized for each input pin. Not only does this possibly affect the delay for this circuit element for a given input pin, it can also affect downstream analysis of the delay for subsequent circuit elements. For example, with regards to paths P1 and P2, if the input slew is much greater for input a of NAND gate N1 than for input b of NAND gate N1, then signal in path P1 is slowed more that path P2 through NAND gate N1 using path based analysis. In addition, there can also be delay effects for downstream elements B5, B6, N2 and N4. Given a smaller input slew for input a of NAND gate N1, path P1 may have less delay through circuit elements B5, B6, N2 and N4 than path P2.

A second difference between graph based analysis and path based analysis is generally referred to as advanced on chip variation (AOCV). Due to expected variations in manufacturing and other causes, a multiplier is applied to the delay for each circuit element (e.g., 1.2) during graph based analysis to account for this variation. However, in a given pathway multiple circuit elements of the same type or general design may be utilized. As a result, the expected total variation for the circuit element type or design in that pathway is less than the sum of the individual variations for each individual circuit element. Typically, the variation reduces as the number of elements in the pathway increases resulting in a less pessimistic delay multiplier. A given circuit element may participate in multiple paths and hence for a bounding GBA analysis, the most pessimistic multiplier for all paths passing through the element is used in computing delay for that element. In path based analysis, this reduction in expected variation can be accounted for by using the actual levels of logic used in a given pathway. This reduction in the delay multiplier is only utilized for a given pathway and is not utilized for the same circuit elements in another circuit pathway. For example, path P1 has ten elements R2, B1-B6, N1, N2 and N4 whereas path P2 has seven elements R3, B5, B6, B7, N1, N2 and N4. The element B5 is a part of both P1 and P2 and a more pessimistic depth of 7 (smaller depth is more pessimistic) would be chosen for it. As a result the delay multiplier used during GBA analysis for element B5 would correspond to a depth of 7 (e.g., 1.20). Similarly, the arc N4/a to N4/z (the output of N4) would get a depth of 6 because it participates in path P1, P2 and P3 and path P3 has the most pessimistic depth of 6. In PBA, a depth of 10 and corresponding delay multiplier of 1.15 would be used for all elements (including B5 and N4). This results in a reduction of pessimism for path P1.

There are many other causes of difference between PBA and GBA than described above including signal integrity effects, common point reconvergence pessimism reduction (CRPR), parametric on chip variation (POCV), statistical STA, etc. These differences can be categorized into statistical types of pessimism reduction (e.g. AOCV and statistical STA) and non-statistical types of pessimism reduction (e.g. worst path arrival difference).

Figure 5:
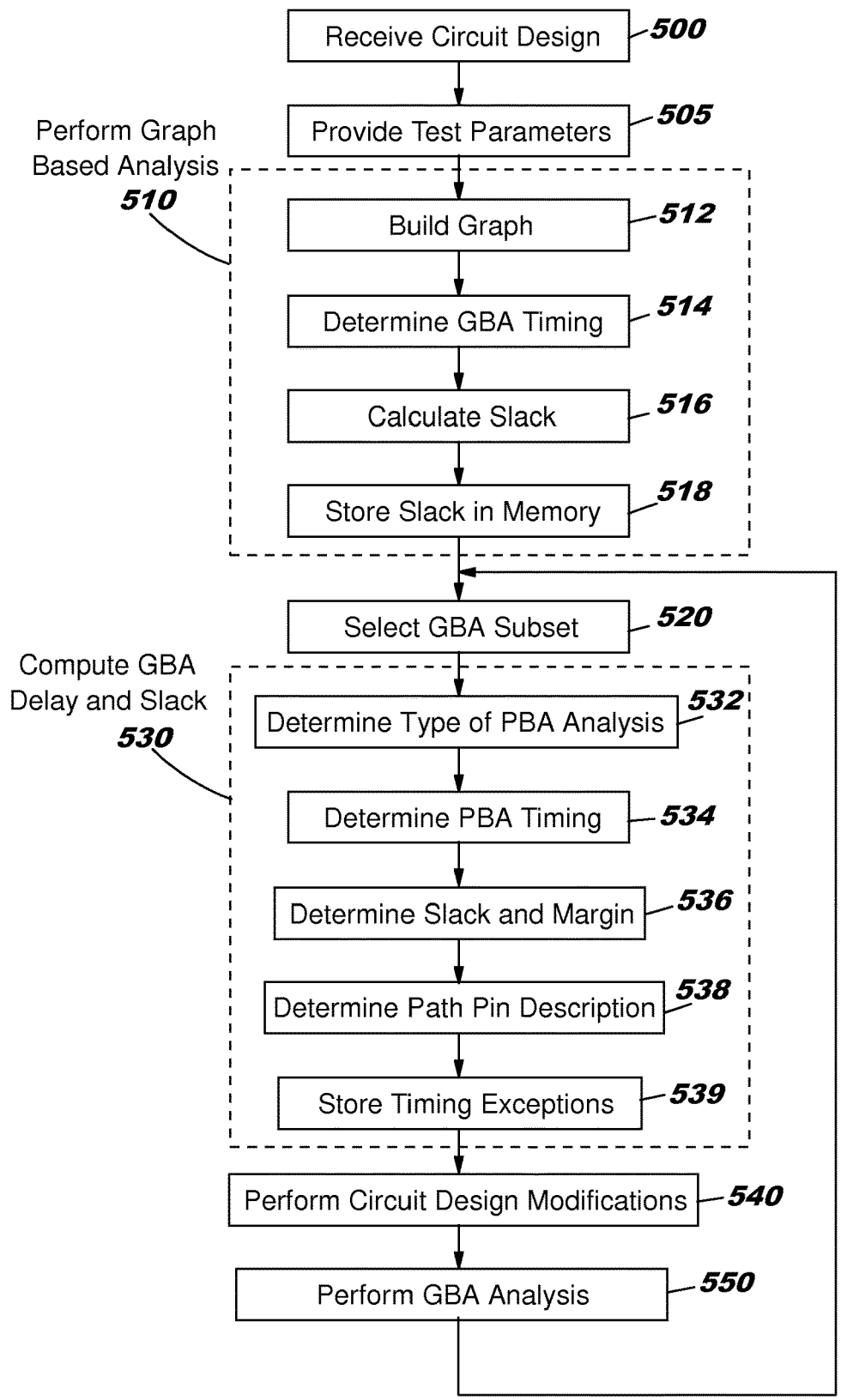
FIG. 5 is a flow diagram of selectively reducing GBA pessimism in which various embodiments may be implemented.

FIG. 5 is a flow diagram of selectively reducing GBA pessimism in which various embodiments may be implemented. In a first step 500, a circuit design is received for implementation or optimization. This circuit design may be a microprocessor with tens of thousands of endpoint circuits or a simple circuit with few endpoints such as an amplifier. Then in step 505, a set of design constraints are provided. These design constraints include (but are not limited to) clock frequency, timing derate multiplier, external delays etc.

Next, a graph based analysis of the circuit is performed on the full circuit design in step 510. This can include multiple sub-steps. First, the graph is built from the circuit design based on design connectivity and user constraints (like clocks) in step 512. This might have been already performed with a previous GBA analysis. Any incremental changes to circuit and constraints are updated. Secondly, the timing for all paths and circuit elements for each endpoint circuit is determined in step 514 using graph based analysis under GBA assumptions (e.g., worst pin input slew, no AOCV, etc.). At the end of this analysis, an expected arrival time is available at each node of the graph. Under graph based analysis, the arrival time at each node is the worst arrival time of all paths going through that node. Thirdly, the slack (Ts) is calculated in step 516 at each endpoint node by comparing the determined arrival time to an required time. That is, the time calculated for each path (Tp) is subtracted from the time required (Tr) for each endpoint circuit (Ts=Tr−Tp). The slack for each path is then stored in memory in step 518. If the slack is negative (i.e., Tr<Tp), then the endpoint has a timing violation because the signal for that path did not arrive in time. Furthermore, as described below, a predetermined margin (Tm) may also be utilized. That is, the time calculated for each path is subtracted from a sum of the time required and the margin (Ts=Tr+Tm−Tp). The margin may be specific for each path.

Then in step 520, a subset of endpoints is selected for GBA pessimism reduction by path based analysis. This subset is referred to herein as a GBA endpoint subset. This can be the endpoints with the worst percentage or absolute number of paths (e.g. those x % or n paths with most negative slack time) or other measure such as those longest paths (most circuit elements) with negative slack as these paths may most need correction or may be more easily corrected. This GBA endpoint subset could include all of the failed paths. Alternatively, this can be a list of endpoints read from a file, criteria provided as guidance by user, or a list stored in memory. Similarly, the number of paths to compute for each endpoint can be predetermined (e.g., 100), read from a file or other computer readable media, or provided as guidance by user. This set of paths of the GBA endpoint subset is referred to as the GBA path subset.

In step 530, GBA path delay and slack is then computed utilizing path based analysis for the GBA path subset of the selected GBA endpoint subset from step 520. This can include multiple sub-steps. First, the type of pessimism reduction utilized during PBA analysis is determined in step 532. The PBA analysis can be performed taking into account all the types of pessimism reduction (statistical such as AOCV and non-statistical such as worst slew) or only some of them. For example, the analysis can be set to be AOCV only, meaning only the AOCV effects are corrected for PBA. In that case only the AOCV depth would be recalculated by path based analysis but slew and signal integrity effects would not be recalculated. This provides a mechanism of trading off runtime for accuracy. Performing full PBA analysis for all the effects is expensive but more accurate. The type of PBA analysis could be determined by how much a path failed the GBA analysis. A worse failing path may be allocated to full PBA analysis and a less failing path may be allocated to AOCV path based analysis. This differentiation can be done manually or applied automatically according to predetermined criteria. This differentiation may also be applied on an endpoint by endpoint basis. Secondly, in step 534 the PBA analysis is performed on the GBA path subset selected above using the newly applied path based allocations of step 532. Thirdly, in step 536, the difference in GBA slack and PBA slack is computed and stored in memory for each of these paths. The difference is referred to herein as the margin (Tm) for each path. That is, each GBA subset path will have a GBA slack from step 516, a PBA slack from step 534, and a margin from step 536.

In step 538, the minimum number of pins required to uniquely identify a path is determined. This is needed to generate a timing exception for the given path. A timing exception typically uses a set of pins specified by "-from", "-through" and "-to" to constructs identify a path. For example, the path P2 in FIG. 4 can be identified as "-from R3/CP-though B7/A-through B7/Y-through N1/b-through N1/Z-through B5/A-through B5/Y-through B6/A-through B6/Y-through N2/A-through N2/Z-through N4/A-through N4/Z-through R1/D" where A and Y are the input and output pins of buffers and CP and D are clock and data pins of registers. In this case, the minimum set of pins needed to specify path P2 is "-through N1/b" as there is only once path going through that pin. Similarly "-through N1/a" can uniquely identify path P1 in FIG. 4. It is not necessary for the number of pins identified to be optimal. Any subset of full path which uniquely represents the path can be used. For example, path P2 may be specified as "-from R3/CP-through N1/b-to R1/D".

In step 539, the margin (computed and stored in step 536) and the set of pins (identified in step 538) are used to specify the timing exception for the selected paths. For example the following timing exception "set path margin-through N1/a 40" to set the margin of 40 (computed in step 530) on path P1. This timing exception (during the next GBA analysis) would loosen the required time of path P1 by 40 hence reducing pessimism. The timing exception applies to the specified path only and hence other paths to the given endpoint are not impacted. Identifying the minimum set of endpoints needed to identify a path reduces the runtime and memory of GBA analysis. A large number of pins specified can reduce the solution space for optimization as the elements specified in exceptions cannot be removed by the optimization process without having to redefine the path.

Although this embodiment utilizes timing exceptions to implement the margin calculated above, alternative methods may be utilized to reduce the pessimism in graph based analysis. For example, path specific timing requirements could be modified. For another example, the margin may be implemented as a margin on the endpoint, but that would impact all paths to that endpoint.

Optimization and/or implementation are performed in step 540. During this step the tool could perform various circuit transformation and implementation steps. This can include changing circuit element types, removing certain circuit elements, resizing or modifying circuit elements, as well as other types of modifications known to those of ordinary skill in the art. Then in step 550, graph based analysis can be performed of the circuit design. This analysis can be a full GBA of the whole circuit design or an incremental GBA of only those paths or endpoints that have been modified. However, with the timing exceptions applied from the above processes, paths which would normally fail PBA analysis will now pass such analysis with the margin provided due to path based analysis of those paths.

Steps 540 and 550 can be repeated multiple times, in parallel or in series. Processing can then return to step 520 above with the updated circuit design to perform further timing analysis and circuit modifications until the circuit design is approved. The timing exceptions can be retained throughout this process to maintain the pessimism reductions gained through path based analysis of selected paths.

For illustrative purposes, an example of the embodiment of FIG. 5 will be provided using the endpoint circuit of FIG. 4. In this example, each of the registers will have a delay of 10 picoseconds, each of the buffers will have a delay of 10 picoseconds (ps), each of the NAND gates a delay of 20 ps (with input a have a delay of 10 ps and input b a delay of 20 ps under path based analysis). A variance timing multiplier can be obtained from a table for that purpose. For example, a depth of 6 can correspond to a variance timing multiplier of 1.25, 7 to 1.20, 8 to 1.15, 9 to 1.13 and 10 to 1.10. This endpoint circuit has a clock cycle of 10 gigahertz or a 100 ps clock cycle. In this example, the required time to meet timing is 100 ps. The clock skew and setup times are ignored in this example for simplicity of illustration. The delays and setup times are a function of slew and capacitance of the circuit. The delay values above have been chosen for simplicity. The interconnect delay is assumed to be 0 for each net. The AOCV depth for each arcs are computed for each element taking the most pessimistic depths for all paths passing through that pin. For example, element B5 participates in path P1 and P2 who have a depth of 10 and 7 respectively. Hence it gets the most pessimistic depth of 7. Similarly, arc N4/A to N4/z participates in paths P1, P2 and P3 and it gets the depth of 6 as this is most pessimistic of 6, 7 and 10 (the depths of P3, P2 and P1 respectively).

For illustrative purposes, path delays of path P1 can be found in FIG. 7 below. Under graph based analysis, path P1 has a delay of (5*10 ps*1.10+20 ps*1.10+2*10 ps*1.20+20 ps*1.20+20 ps*1.25)=150 ps. Similarly, path P2 gets a delay of 121 ps, path P3 a delay of 100 ps, path P4 a delay of 118 ps, and path P5 a delay of 115 ps. The corresponding GBA slacks are −50 ps, −21 ps, 0 ps, −18 ps and −15 ps. As a result, only path P3 passes the timing analysis and path P1 is has the worst delay. Using path based analysis of path P1, a different result is generated. For path P1 there are 10 circuit elements so the variance multiplier is 1.10 for those elements, and the a input is used for all three NAND gates, so the delay for each of those circuit elements is 10 ps. This creates a total delay of (7*10 ps*1.10+3*10 ps*1.10)=110 ps with a PBA slack of 10 ps or a margin of 40 ps (|−50 ps−−10 ps|)). A timing exception of 40 ps for path P1 is then stored in memory.

Path P1 could be modified by removing two buffers B2 and B3 is that is acceptable under other design conditions. This would reduce the number of circuit elements in path P1 to 8, so the variance multiplier is increased to 1.15. As a result of these changes the total delay would be (5*10 ps*1.15+3*10 ps*1.15)=92 ps using path based analysis, which passes. However, path based analysis is typically not recalculated, which uses valuable time and computer resources Instead, graph based analysis may be incrementally rerun of path P1 with the timing exception of 40 ps. The result would be (3*10 ps*1.15+20 ps*1.15+2*10 ps*1.20+ 20 ps*1.20+20 ps*1.25−40 ps)=91.5 ps which passes while not requiring any additional PBA analysis of that path. The next set of failed paths (e.g. paths P2, P4 and P5) may then be reviewed using path based analysis.

Although the results of the incremental graph based analysis do not exactly match an updated path based analysis, it is close enough for purposes here. Updated path based analysis could be rerun for any path with a timing exception to verify full compliance with the timing requirements. Such updated path based analysis could then be used to recalculate the timing exceptions.

FIGS. 6A-6B are block diagrams of data structures in which various embodiments may be implemented. FIG. 6A illustrates a listing 600 of circuit elements which may be organized into various endpoint circuits. Included are an identifier 605 of the circuit element, the type 610 of circuit element, an overall input slew 615 of the circuit element, and output load time 620 of the circuit element, a variance multiplier 625 for the circuit element, and any other attributes 630 of the circuit element. Identifier 605 is unique for each circuit element, although alternative embodiments could use the same circuit element in multiple locations if they are identical. Type 610 is the general type of the circuit element. Circuit elements of the same type, due to their close similarity, may be combined for purposes of reducing overall variance. Overall input slew 615 is the input slew of the circuit element. Where the circuit element has multiple pins, the worst input slew is stored here. Output load time 620 is the output load time of the circuit element. Variance multiplier 625 is a multiplier used for this circuit element to take into account variations in performance for that circuit element which may be caused by manufacturing and other sources of variation. In this example, a separate variance multiplier may be provided for each type of circuit element, although alternative embodiments may utilize a common multiplier for all circuit elements or types of circuit elements. Other attributes 630 includes other attributes of the circuit element which may be useful. For example, if a circuit element has multiple input pins, the input slew for each input pin may be provided here.

FIG. 6B illustrates a listing 650 of circuit paths derived from endpoint circuits. Included are a path identifier 652, an endpoint circuit identifier 654, a path layout 660, a required arrival time 665, a GBA determined arrival time 670, a GBA slack 675, a PBA determined arrival time 680, a PBS slack 685, a margin 690, and other information 695. Path identifier (ID) 652 is a unique identifier of the path. In this case, path P1, P2, P3, P4 or P5 as referenced in FIG. 3. Endpoint circuit identifier 654 includes the endpoint circuit element for additional identification of the circuit. Elements 654 and 652 could be combined. Larger circuits would obviously need more detailed identifiers. Path layout 660 references the major circuit elements along the path. More specifically, the endpoints and any mid-points that converge with other paths such as multi-input gates. A path could be described using all the elements of a path. However, such a detailed path description does not allow the removal or substitution of some circuit elements, requires more memory to store, and requires more runtime to handle. Require arrival time 665 is the time required for a signal to arrive to avoid failing the test (and for the underlying circuitry to reliable perform as expected). GBA determined arrival time 670 is the expected arrival time of a signal along the path using graph based analysis. GBA slack is the difference between the required arrival time and the GBA arrival time. A positive GBA slack is desired for a reliably performing circuit path. PBA determined arrival time 680 is the expected arrival time of a signal along the path using path based analysis. PBA slack 685 is the difference between the required arrival time and the PBA arrival time. A positive PBA slack is desired for a reliably performing circuit path. Margin 690 is the difference between GBA slack and PBA slack and demonstrates the difference between pessimism between the two analytical techniques. Margin 690 can be used to offset the GBA slack in future GBA calculations for the same path. Other information 695 can include other information which can be stored for a given path such as whether the path is now approved or for a tag used in further processing. That is, each path already analyzed with PBA and modified may be given a numeric tag where all other paths not yet analyzed may retain a tag of 1.

FIG. 7 is a block diagram of exemplary path delays for the exemplary circuit of FIG. 4 which can be utilized during selective path based analysis in which various embodiments may be implemented. Table 700 includes a variety of data useful for path based analysis as described above with reference to FIG. 4. This includes GBA depth 710 of the circuit and PBA depth 712 of the circuit. The final GBA delay 720 is accumulated from delays through the arc path of path P1 in this example.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for selectively reducing graph based analysis pessimism. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of designing an integrated circuit (IC) design, the computer-implemented method comprising:
    identifying, by a processor, a set of endpoints of the IC design;
    performing, by the processor, a first graph based analysis associated with the set of endpoints;
    performing, by the processor, a path based analysis associated with the set of endpoints;

determining, by the processor, a timing margin between the graph based analysis and the path based analysis associated with each endpoint in the set of endpoints;

performing, by the processor, a second graph based analysis of each endpoint in the set of endpoints in accordance with the timing margin determined for the endpoint; and modifying, by the processor, the IC design in accordance with the second graph based analysis.

2. The computer-implemented method of claim 1 further comprising implementing, by the processor, each timing margin as a timing exception.

3. The computer-implemented method of claim 1 wherein for each endpoint the timing margin is calculated as a difference between the graph based analysis and the path based analysis associated with the endpoint.

4. The computer-implemented method of claim 1 wherein each timing margin is stored as a timing exception to the corresponding endpoint circuit path.

5. The computer-implemented method of claim 1 further comprising identifying, by the processor, a minimum number of pins to uniquely identify each endpoint.

6. The computer-implemented method of claim 5 wherein each timing margin is stored as a timing exception to the corresponding endpoint circuit path using the identified minimum number of pins for that endpoint circuit path.

7. The method of computer-implemented claim 1 further comprising modifying, by the processor, circuit elements disposed in at least one of the paths associated with the endpoint and in accordance with the timing margin associated with the endpoint.

8. A non-transitory computer readable storage medium comprising instructions which when executed by a processor, causes the processor to:

identify a set of endpoints of an integrated circuit design;

perform a first graph based analysis associated with the set of endpoints;

perform path based analysis associated with the set of endpoints;

determine a timing margin between the graph based analysis and the path based analysis associated with each endpoint;

perform a second graph based analysis of each endpoint in the set of endpoints in accordance with the timing margin determined for the endpoint; and modify the IC design in accordance with the second graph based analysis.

9. The non-transitory computer readable storage medium of claim 8 wherein said instructions further cause the processor to implement each timing margin as a timing exception.

10. The non-transitory computer readable storage medium of claim 8 wherein for each endpoint the timing margin is calculated as a difference between the graph based analysis and the path based analysis associated with the endpoint.

11. The non-transitory computer readable storage medium of claim 8 wherein each timing margin is stored as a timing exception to the corresponding endpoint circuit path.

12. The non-transitory computer readable storage medium of claim 8 wherein said instructions further cause the processor to identify a minimum number of pins to uniquely identify each endpoint circuit path.

13. The non-transitory computer readable storage medium of claim 12 wherein each timing margin is stored as a timing exception to the corresponding endpoint circuit path using the identified minimum number of pins for that endpoint circuit path.

14. The non-transitory computer readable storage medium of claim 8 wherein said instructions further cause the processor to modify circuit elements disposed in at least one of the paths associated with the endpoint and in accordance with the timing margin associated with the endpoint.

15. A data processing system for designing an integrated circuit (IC), the data processing system comprising:

a processor; and a memory storing program instructions which when executed by the processor cause the processor to:

identify a set of endpoints of the integrated circuit design;

perform a first graph based analysis associated with the set of endpoints;

perform path based analysis associated with the set of endpoints;

determine a timing margin between the graph based analysis and the path based analysis associated with each endpoint;

perform a second graph based analysis of each endpoint in the set of endpoints in accordance with the timing margin determined for the endpoint; and modify the IC design in accordance with the second graph based analysis.

16. The data processing system of claim 15 wherein said instructions further cause the processor to implement each timing margin as a timing exception.

17. The data processing system of claim 15 wherein for each endpoint the timing margin is calculated as a difference between the graph based analysis and the path based analysis associated with the endpoint.

18. The data processing system of claim 15 wherein each timing margin is stored as a timing exception to the corresponding endpoint circuit path.

19. The data processing system of claim 15 wherein said instructions further cause the processor to identify a minimum number of pins to uniquely identify each endpoint circuit path.

20. The data processing system of claim 19 wherein each timing margin is stored as a timing exception to the corresponding endpoint circuit path using the identified minimum number of pins for that endpoint circuit path.

21. The data processing system of claim 15 wherein said instructions further cause the processor to modify circuit elements disposed in at least one of the paths associated with the endpoint and in accordance with the timing margin associated with the endpoint.

* * * * *